United States Patent
Lee (10) Patent No.: US 11,746,430 B2
(45) Date of Patent: Sep. 5, 2023

(54) WATER ELECTROLYSIS SYSTEM AND CONTROL METHOD THEREOF

(71) Applicants: Hyundai Motor Company, Seoul (KR); Kia Motors Corporation, Seoul (KR)

(72) Inventor: Se Yeong Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 300 days.

(21) Appl. No.: 16/990,589

(22) Filed: Aug. 11, 2020

(65) Prior Publication Data
US 2021/0254227 A1 Aug. 19, 2021

(30) Foreign Application Priority Data
Feb. 14, 2020 (KR) .................. 10-2020-0018374

(51) Int. Cl.
*C25B 15/08* (2006.01)
*B01D 19/00* (2006.01)
(Continued)

(52) U.S. Cl.
CPC ........ *C25B 15/087* (2021.01); *B01D 19/0073* (2013.01); *C25B 1/04* (2013.01);
(Continued)

(58) Field of Classification Search
CPC ........... C25B 1/02–1/044; C25B 15/02; C25B 15/023
(Continued)

(56) References Cited

U.S. PATENT DOCUMENTS

| | | | |
|---|---|---|---|
| 2003/0141200 A1 * | 7/2003 | Harada | ................ C25B 15/02 |
| | | | 205/637 |
| 2006/0151332 A1 * | 7/2006 | Stull | .................... C25B 9/23 |
| | | | 205/637 |

(Continued)

FOREIGN PATENT DOCUMENTS

| | | | | | |
|---|---|---|---|---|---|
| JP | WO 2017/090431 A1 * | 6/2017 | | ............... | C25B 1/04 |
| WO | WO 2022/056606 A1 * | 3/2022 | | ........... | C25B 15/085 |

OTHER PUBLICATIONS

Janssen et al, Safety-related studies on hydrogen production in high-pressure electrolysers, International Journal of Hydrogen Energy, vol. 29, No. 7, Jul. 2004, pp. 759-770 (Year: 2004).*

Grigoriev et al, Hydrogen safety aspects related to high-pressure polymer electrolyte membrane water electrolysis, International Journal of Hydrogen Energy, vol. 34, No. 14, Jul. 2009, pp. 5986-5991 (Year: 2009).*

(Continued)

*Primary Examiner* — Harry D Wilkins, III
(74) *Attorney, Agent, or Firm* — Fox Rothschild LLP (57) ABSTRACT

Disclosed are a water electrolysis system and a control method thereof. The water electrolysis system includes: i) a water electrolysis stack including active electrodes receiving an electrolyte and producing hydrogen and oxygen by electrolyzing the electrolyte; ii) a gas-liquid separation device receiving a product produced from the water electrolysis stack, separating the product into an electrolyte, oxygen, and hydrogen, and discharging the electrolyte, oxygen, and hydrogen; iii) a hydrogen sensor measuring a concentration of hydrogen in oxygen discharged from the gas-liquid separation device or a concentration of hydrogen in a circulating electrolyte; and iv) an electrolyte re-supplying module replenishing the electrolyte discharged from the gas-liquid separation device with water and then re-supplying the electrolyte to the water electrolysis stack, and (Continued)

selectively raising a temperature of the electrolyte on the basis of the concentration of hydrogen measured by the hydrogen sensor to remove gas in the electrolyte.

15 Claims, 4 Drawing Sheets

(51) Int. Cl.
- C25B 1/04 (2021.01)
- C25B 9/17 (2021.01)
- C25B 15/021 (2021.01)
- C25B 15/029 (2021.01)
- C25B 9/67 (2021.01)

(52) U.S. Cl.
CPC .............. *C25B 9/17* (2021.01); *C25B 9/67* (2021.01); *C25B 15/021* (2021.01); *C25B 15/029* (2021.01); *C25B 15/08* (2013.01)

(58) Field of Classification Search
USPC ........................................... 205/335
See application file for complete search history.

(56) References Cited

U.S. PATENT DOCUMENTS

| | | | |
|---|---|---|---|
| 2010/0025258 A1* | 2/2010 | Lindsay | C25B 1/04 205/335 |
| 2017/0314146 A1* | 11/2017 | Hosseini Hashemi | C25B 1/04 |
| 2018/0371630 A1* | 12/2018 | Swiegers | C25B 1/04 |
| 2022/0113271 A1* | 4/2022 | Kato | C25B 1/04 |
| 2022/0325425 A1* | 10/2022 | Koponen | C25B 15/08 |

OTHER PUBLICATIONS

Grigoriev et al, High-pressure PEM water electrolysis and corresponding safety issues, International Journal of Hydrogen Energy, vol. 36, No. 3, Feb. 2011, pp. 2721-2728 (Year: 2011).*

Haug et al, Influence of process conditions on gas purity in alkaline water electrolysis, International Journal of Hydrogen Energy, vol. 42, No. 15, Apr. 2017, pp. 9406-9418 (Year: 2017).*

Machine translation of Sumita (WO 2017/090431 A1) (Year: 2017).*

* cited by examiner

WATER ELECTROLYSIS SYSTEM AND CONTROL METHOD THEREOF

CROSS REFERENCE TO RELATED APPLICATION

The present application claims priority to Korean Patent Application No. 10-2020-0018374, filed Feb. 14, 2020, the entire contents of which is incorporated herein for all purposes by this reference.

TECHNICAL FIELD

The present invention relates to a water electrolysis system that produces hydrogen. The water electrolysis system may prevent hydrogen and oxygen from being mixed with each other and eliminate a risk of explosion by measuring and monitoring a concentration of hydrogen mixed with an oxygen gas or a concentration of hydrogen dissolved in an electrolyte and heating the electrolyte on the basis of the measured concentration value to remove a residual gas.

BACKGROUND

Hydrogen has a very high energy density, and has been prominent as an environmentally friendly energy source. When hydrogen is used as a fuel, there is no product harmful to an environment except for a very small amount of nitrogen oxide, and hydrogen is easily stored in various forms such as a high pressure gas form, a liquid gas form, or a metal hydride form. Therefore, a technology that uses hydrogen as an energy source has been developed in various fields.

As a method of producing hydrogen having a high energy density, there are various methods such as fossil fuel reforming, a by-product gas generated from an industrial process, biomass gasification, and water electrolysis using renewable energy.

For example, the water electrolysis is a method of obtaining hydrogen by separating water molecules into hydrogen molecules and oxygen molecules using electricity. The water electrolysis, which is the most environmentally friendly method of producing hydrogen, has been known as a technology capable of continuously producing hydrogen without discharging carbon dioxide when using renewable energy such as sunlight or wind power.

Hydrogen is an explosive gas and may easily explode, and oxygen is a supporting gas, and when oxygen exists together with hydrogen whose concentration is a predetermined concentration or greater, a combustion condition is satisfied, such that a fire may occur. Therefore, when a concentration of hydrogen in oxygen discharged from an oxygen discharging portion becomes a predetermined level or greater, there is a risk of combustion and explosion, and thus, the concentration of hydrogen throughout a water electrolysis system needs to be continuously monitored. In addition, a concentration of hydrogen dissolved in an electrolyte also needs to be managed.

In a water electrolysis system according to the related art, a current density has been limited to a predetermined level or less in order to maintain a concentration of hydrogen gas contained in an oxygen gas at a predetermined level or less. In addition, when the concentration of hydrogen exceeded a predetermined range, an operation of the water electrolysis system has been stopped. Therefore, it was difficult to stably operate the water electrolysis system.

SUMMARY

In preferred aspects, provided is a water electrolysis system capable of preventing oxygen and hydrogen from being mixed by removing oxygen and hydrogen dissolved in an electrolyte and then supplying the electrolyte to a water electrolysis stack.

In one aspect, provided is a water electrolysis system including: i) a water electrolysis stack including active electrodes receiving an electrolyte and producing hydrogen and oxygen by electrolyzing the electrolyte; ii) a gas-liquid separation device receiving a product produced from the water electrolysis stack, separating the product into an electrolyte, oxygen, and hydrogen, and discharging the electrolyte, oxygen, and hydrogen; iii) a hydrogen sensor measuring a concentration of hydrogen in oxygen discharged from the gas-liquid separation device or a concentration of hydrogen in a circulating electrolyte; and iv) an electrolyte re-supplying module replenishing the electrolyte discharged from the gas-liquid separation device with water and then re-supplying the electrolyte to the water electrolysis stack, and selectively raising a temperature of the electrolyte on the basis of the concentration of hydrogen measured by the hydrogen sensor to remove gas in the electrolyte.

The water electrolysis system may further include a controller controlling the electrolyte re-supplying module, controlling a first channel through which the electrolyte circulating through the electrolyte re-supplying module is supplied on the basis of the concentration of hydrogen measured by the hydrogen sensor, and controlling a heating temperature of the electrolyte The controller may control the electrolyte re-supplying module to heat the electrolyte circulating through the electrolyte re-supplying module to a temperature equal to or greater than a normal operating temperature to remove a residual gas dissolved in the electrolyte, replenish the electrolyte with the water, and then supply the electrolyte to the water electrolysis stack, when the concentration of hydrogen measured by the hydrogen sensor is equal to or greater than a reference value. The controller may control the electrolyte re-supplying module to maintain the electrolyte circulating through the electrolyte re-supplying module at the normal operating temperature, replenish the electrolyte with the water, and then supply the electrolyte to the water electrolysis stack, when the concentration of hydrogen measured by the hydrogen sensor is less than the reference value.

The controller may control the electrolyte re-supplying module to maintain the electrolyte circulating through the electrolyte re-supplying module at the normal operating temperature of the water electrolysis system, and control the electrolyte re-supplying module to heat the electrolyte to the temperature equal to or higher than the normal operating temperature in a case of heating the electrolyte.

The normal operating temperature of the water electrolysis system may be about 60° C. or greater and about 80° C. or less, and the controller may control the electrolyte re-supplying module to heat the electrolyte to a temperature of about 100° C. or greater in a case of heating the electrolyte.

The electrolyte re-supplying module may control a heating temperature of the electrolyte on the basis of a concentration of electrolyte.

The electrolyte re-supplying module may include a first heat exchange unit heating the electrolyte discharged from the gas-liquid separation device to raise the temperature of the electrolyte and replenishing the electrolyte with the water and a second heat exchange unit connected to the first heat exchange unit, replenishing the electrolyte supplied from the first heat exchange unit with the water, and then supplying the electrolyte to the water electrolysis stack, and may further include a branch point which is formed on a connection line between the first heat exchange unit and the second heat exchange unit and at which the electrolyte bypasses the second heat exchange unit to be introduced into the water electrolysis stack, such that the electrolyte passing through the first heat exchange unit is introduced into the second heat exchange unit or bypasses the second heat exchange unit to be directly introduced into the water electrolysis stack.

The electrolyte re-supplying module may further include a first control valve provided at a branch point at which the electrolyte is branched from the first heat exchange unit to the second heat exchange unit or the water electrolysis stack and controlling a second channel through which the electrolyte is supplied.

The electrolyte re-supplying module may further include a water tank in which the water to be supplied to the electrolyte is stored and connected to the first heat exchange unit and the second heat exchange unit, and the water tank may be connected to the first heat exchange unit and the second heat exchange unit so that the water discharged from the water tank is selectively branched into the first heat exchange unit or the second heat exchange unit.

The electrolyte re-supplying module may further include a second control valve provided at a point at which the water is branched from the water tank into the first heat exchange unit or the second heat exchange unit and controlling a third channel through which the water is supplied.

When the concentration of hydrogen measured by the hydrogen sensor is a reference value or greater, the first control valve may control the second channel so that the first heat exchange unit and the second heat exchange unit are connected to each other, such that the electrolyte is heated in the first heat exchange unit to remove a residual gas dissolved in the electrolyte and is then introduced into the second heat exchange unit, and the second control valve may control the third channel so that the water tank and the second heat exchange unit are connected to each other, such that the electrolyte passing through the first heat exchange unit is replenished with the water in the second heat exchange unit and is then supplied to the water electrolysis stack.

The first heat exchange unit may heat the electrolyte at a high temperature so that the residual gas dissolved in the electrolyte is discharged.

When the concentration of hydrogen measured by the hydrogen sensor is less than the reference value, the second control valve may control the third channel so that the water tank and the first heat exchange unit are connected to each other, such that the water is introduced into the first heat exchange unit to be replenished in the electrolyte, and the first control valve may control the second channel so that the first heat exchange stack and the water electrolysis stack are connected to each other, such that the electrolyte passing through the first heat exchange unit bypasses the second heat exchange unit to be supplied to the water electrolysis stack.

In an aspect, provided is a control method of a water electrolysis system including: producing hydrogen and oxygen by an electrolysis reaction by a water hydrolysis stack, introducing the generated hydrogen, oxygen, and electrolyte into a gas-liquid separation device, and separating hydrogen, oxygen, and the electrolyte by the gas-liquid separation device; measuring a concentration of hydrogen in oxygen discharged from the gas-liquid separation device or a concentration of hydrogen in the electrolyte by a hydrogen sensor; comparing the concentration of hydrogen measured by the hydrogen sensor with a reference value; and replenishing the electrolyte discharged from the gas-liquid separation device with water and then re-supplying the electrolyte to the water electrolysis stack, and selectively raising a temperature of the electrolyte on the basis of the concentration of hydrogen measured by the hydrogen sensor to remove gas in the electrolyte.

In the replenishing the electrolyte, when the concentration of hydrogen measured by the hydrogen sensor is equal to or less than about 50% of an explosion lower limit, the temperature of the electrolyte may be raised, and the electrolyte may then be supplied to water electrolysis stack, and when the concentration of hydrogen measured by the hydrogen sensor is greater than about 50% of the explosion lower limit, an operation of the water electrolysis system may be stopped.

In the replenishing the electrolyte, when the concentration of hydrogen measured by the hydrogen sensor reaches about 25% of the explosion lower limit, a warning signal may be transmitted.

Other aspects of the invention are disclosed infra.

DETAILED DESCRIPTION

Specific structural and functional descriptions various embodiments of the present invention disclosed in the present specification or application will be provided only in order to describe embodiments of the present invention. Therefore, embodiments of the present invention may be implemented in various forms, and the present invention is not to be interpreted as being limited to embodiments described in the present specification or invention.

Since embodiments of the present invention may be various modified and may have several forms, specific embodiments will be illustrated in the drawings and will be described in detail in the present specification or application. However, it is to be understood that the present invention is not limited to specific embodiments, but includes all modifications, equivalents, and substitutions included in the spirit and the scope of the present invention.

Terms such as 'first', 'second', and the like, may be used to describe various components, but these components are not to be construed as being limited to these terms. These terms are used only to distinguish one component from another component. For example, a first component may be named a second component and a second component may also be similarly named a first component, without departing from the scope of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, various exemplary embodiments of the present invention will be described in detail with reference to the accompanying drawings. Like reference numerals proposed in each drawing denote like components.

The present invention relates to a water electrolysis system that produces hydrogen, and more particularly, to a water electrolysis system monitoring a concentration of hydrogen and selectively heating an electrolyte on the basis of the concentration of hydrogen to remove a residual gas, in order to prevent hydrogen and oxygen from being mixed with each other, and a control method thereof.

Figure 1:
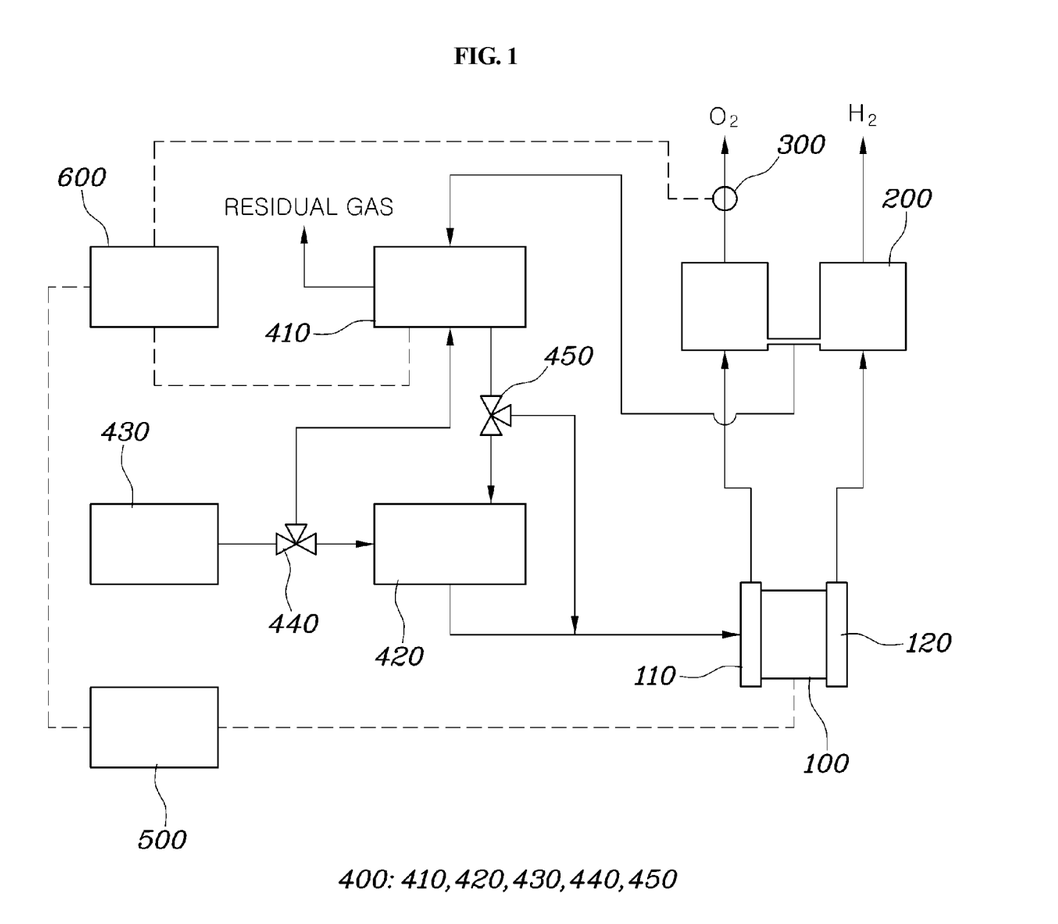
FIG. 1 is a view illustrating a water electrolysis system according to an exemplary embodiment of the present invention.

FIG. 1 is a view illustrating a water electrolysis system according to an exemplary embodiment of the present invention.

As shown in FIG. 1, a water electrolysis system according to an exemplary embodiment of the present invention may include a water electrolysis stack 100, a gas-liquid separation device 200, a hydrogen sensor 300, and an electrolyte re-supplying module 400.

When power is applied to the water electrolysis stack 100, the water electrolysis stack 100 may produce hydrogen and oxygen by electrolyzing an electrolyte. The electrolyte may be an alkaline solution such as KOH or NaOH. The water electrolysis stack 100 may be connected to a power supplying unit 500, and may include active electrodes electrolyzing the electrolyte to produce oxygen or hydrogen. The active electrodes of the water electrolysis stack 100 require a low over-voltage and high corrosion resistance at the time of generating hydrogen or oxygen, and electrodes having low resistance under an alkaline condition may be used as the active electrodes.

When the power is applied to the water electrolysis stack 100 by the power supplying unit 500, one of the active electrodes becomes a positive electrode and the other of the active electrodes becomes a negative electrode. A current flows from the positive electrode to the negative electrode, and when a direction of the current is switched, the positive electrode and the negative electrode are switched with each other.

In the present invention, the active electrode in which oxygen is generated is defined as an anode 110 and the active electrode in which hydrogen is generated is defined as a cathode 120. The anode 110 and the cathode 120 illustrated in FIG. 1 may be switched with each other depending on a direction in which the current is applied.

When the power supplying unit 500 supplies the power to the water electrolysis stack 100, the current starts to flow to the active electrodes. In this case, the active electrode connected to the positive electrode becomes the anode 110 in which an oxidation reaction in which oxygen is generated occurs, and the active electrode connected to the negative electrode becomes the cathode 120 in which a reduction reaction in which hydrogen is generated occurs. Reactions occurring in the cathode 120 and the anode 110 are as follows.

Anode 110: $4OH^- \rightarrow 2H_2O + 4e^- + O_2$

Cathode 120: $4H_2O + 4e^- \rightarrow 4OH^- + 2H_2$  [Reaction Formulas]

The gas-liquid separation device 200 may perform a function of receiving a product produced from the water electrolysis stack 100, separating the product into an electrolyte, oxygen, and hydrogen, and discharging the electrolyte, oxygen, and hydrogen. Hydrogen generated in the cathode 120 and oxygen generated in the anode 110 may be separated and discharged, and the electrolyte may be discharged to the electrolyte re-supplying module 400.

When hydrogen, oxygen, and the electrolyte are separated and discharged by the gas-liquid separation device, hydrogen, oxygen, and the electrolyte may be discharged in a state where they are mixed with each other and are not completely separated. The reason is that when hydrogen or oxygen is produced in the water electrolysis stack 100, hydrogen and oxygen are mixed with each other in a state where they are not partially separated. A portion of oxygen produced by the anode 110 may be joined into and mixed with a hydrogen flow, or a portion of hydrogen produced by the cathode 120 may be joined into and mixed with an oxygen flow.

In addition, oxygen and hydrogen may be partially dissolved in the electrolyte and discharged to the electrolyte re-supplying module 400. Therefore, a dissolved residual gas may be contained in the electrolyte circulating through the electrolyte re-supplying module 400.

The hydrogen sensor 300 is a device that measures a concentration of hydrogen. The hydrogen sensor 300 may measure a concentration of hydrogen contained in oxygen discharged from the gas-liquid separation device 200. In addition, the hydrogen sensor 300 may be provided in the electrolyte re-supplying module 400 to measure a concentration of hydrogen in the electrolyte circulating through the electrolyte re-supplying module 400. An example where the hydrogen sensor 300 is provided at an outlet of oxygen discharged from the gas-liquid separation device 200 has been illustrated in FIG. 1, but the hydrogen sensor 300 is not limited thereto, and may also be provided in the electrolyte re-supplying module 400 at the time of measuring the concentration of hydrogen in the electrolyte.

The hydrogen sensor 300 may continuously measure the concentration of hydrogen to manage a risk of explosion due to hydrogen discharged from the gas-liquid separation device 200. Generally, when a concentration of hydrogen in oxygen becomes about 4%, there is a risk of explosion, and the concentration of hydrogen in oxygen is thus controlled to be maintained at 4% or less. In other words, the water electrolysis system needs to be operated in a state where the concentration of hydrogen in oxygen is controlled to about 4% or less, which is an explosion lower limit.

The electrolyte re-supplying module 400 is a device that supplies the electrolyte to the water electrolysis stack 100. The electrolyte re-supplying module 400 may perform a function of continuously supplying water and the electrolyte so that an electrolysis reaction may continuously occur in the water electrolysis stack 100.

The electrolyte re-supplying module 400 may include a first heat exchange unit 410, a second heat exchange unit 420, a water tank 430, a second control valve 440, and a first control valve 450. Detailed functions of respective components constituting the electrolyte re-supplying module 400 will be described later through a specific embodiment. However, the electrolyte re-supplying module 400 is a component that replenishes the electrolyte discharged from the gas-liquid separation device 200 with water and then supplies the electrolyte to the water electrolysis stack 100, and is not limited to the specific embodiment.

The electrolyte re-supplying module 400 may selectively raise a temperature of the electrolyte on the basis of the concentration of hydrogen measured by the hydrogen sensor 300. When the concentration of hydrogen measured by the hydrogen sensor 300 is equal to or greater than a reference value at which the risk of explosion is recognized, the electrolyte re-supplying module 400 may remove hydrogen and oxygen that are not separated by the gas-liquid separation device 200 by heating the electrolyte to a high temperature to reduce gas solubility of the electrolyte. In this case, the electrolyte may be heated to a temperature equal to greater than a normal operating temperature of the water electrolysis system to discharge a residual gas dissolved in the electrolyte, and be then supplied to the water electrolysis stack 100.

On the other hand, when the concentration of hydrogen measured by the hydrogen sensor 300 is less than the reference value at which the risk of explosion is recognized, the electrolyte re-supplying module 400 may heat the electrolyte to a temperature of about 60° C. or greater and about 80° C. or less, which is the normal operating temperature of the water electrolysis system, and then supply the electrolyte to the water electrolysis stack 100.

As described above, the electrolyte re-supplying module 400 may selectively raise the temperature of the electrolyte on the basis of the concentration of hydrogen. In the present invention, a mode in which the water electrolysis system is operated when the concentration of hydrogen is equal to or greater than the reference value will be defined as a temperature raising mode, and a mode in which the water electrolysis system is operated when the concentration of hydrogen is less than the reference value will be defined as an isothermal mode.

The reference value may be variably set depending on a power generation load of the water electrolysis system. For example, when the explosion lower limit is set to about 4%, about 10% of the explosion lower limit may be set as the reference value. Preferably, the concentration of hydrogen in oxygen of about 0.4% may be set as the reference value. Therefore, when the concentration of hydrogen in oxygen measured by the hydrogen sensor 300 is equal to or greater than about 0.4%, the water electrolysis system may be operated in the temperature raising mode, and when the concentration of hydrogen in oxygen measured by the hydrogen sensor 300 is equal to or less than about 0.4%, the water electrolysis system may be operated in the isothermal mode.

In addition, the water electrolysis system according to an exemplary embodiment of the present invention may further include a controller 600. The controller 600 may control the electrolyte re-supplying module 400. The controller 600 may control a first channel through which the electrolyte circulating through the electrolyte re-supplying module 400 is supplied on the basis of the concentration of hydrogen measured by the hydrogen sensor 300. In addition, the controller 600 may control a heating temperature of the electrolyte depending on the concentration of hydrogen to control an operation mode of the water electrolysis system.

When the concentration of hydrogen measured by the hydrogen sensor 300 is equal to or greater than the reference value, the controller 600 may control the electrolyte re-supplying module 400 to heat the electrolyte circulating through the electrolyte re-supplying module 400 to the temperature equal to or greater than the normal operating temperature of the water electrolysis system. For example, the controller 600 may control the electrolyte re-supplying module 400 to heat the electrolyte to the temperature equal to or greater than the normal operating temperature to remove the residual gas dissolved in the electrolyte, replenish the electrolyte with the water, and then supply the electrolyte to the water electrolysis stack 100.

In addition, when the concentration of hydrogen measured by the hydrogen sensor 300 is less than the reference value, the controller 600 may control the electrolyte re-supplying module 400 to maintain the electrolyte at the normal operating temperature, replenish the electrolyte with the water, and then supply the electrolyte the water to the water electrolysis stack 100.

For example, the controller 600 may control the electrolyte re-supplying module 400 to set the temperature of the electrolyte circulating through the electrolyte re-supplying module 400 to a temperature of about 60° C. or greater and about 80° C. or less, and control the electrolyte re-supplying module 400 to heat the electrolyte to a temperature of about 100° C. or greater in a case of selectively heating the electrolyte. That is, in the isothermal mode, the normal operating temperature of the electrolyte may be about 60° C. to 80° C., and in a case of heating the electrolyte to the temperature equal to or greater than the normal operating temperature in the temperature raising mode, the temperature of the electrolyte may be about 100° C. or greater.

In addition, the electrolyte re-supplying module 400 may control the heating temperature of the electrolyte on the basis of a concentration of electrolyte. For heating the electrolyte, the heating temperature of the electrolyte may be controlled in proportion to the concentration of electrolyte to effectively discharge the residual gas dissolved in the electrolyte.

The electrolyte re-supplying module 400 will be described in detail with reference to FIG. 1. The electrolyte re-supplying module 400 may include the first heat exchange unit 410 heating the electrolyte discharged from the gas-liquid separation device 200 to raise the temperature of the electrolyte and replenishing the electrolyte with the water and the second heat exchange unit 420 connected to the first heat exchange unit 410, replenishing the electrolyte supplied from the first heat exchange unit 410 with the water, and then supplying the electrolyte to the water electrolysis stack 100. A branch point at which the electrolyte may bypass the second heat exchange unit 420 to be directly introduced into the water electrolysis stack 100 may be formed on a line through which the electrolyte is supplied from the first heat exchange unit 410 to the second heat exchange unit 420. Therefore, the electrolyte passing through the first heat exchange unit 410 may be introduced into the second heat exchange unit 420 or bypass the second heat exchange unit 420 to be directly introduced into the water electrolysis stack 100.

The electrolyte re-supplying module 400 may include the water tank 430 in which the water to be supplied to the electrolyte is stored. For example, the water may be pure water or ultra-pure water. The water tank 430 is connected to the first heat exchange unit 410 and the second heat exchange unit 420. For example, the water tank 430 may be connected to the first heat exchange unit 410 and the second heat exchange unit 420 so that the water discharged from the water tank 430 may be selectively branched into the first heat exchange unit 410 or the second heat exchange unit 420.

The electrolyte re-supplying module 400 may include the first control valve 450 and the second control valve 440. The first control valve 450 may be provided at a branch point at which the electrolyte is branched from the first heat exchange unit 410 to the second heat exchange unit 420 or the water electrolysis stack 100. The electrolyte passing through the first heat exchange unit 410 may be selectively introduced into the second heat exchange unit 420 or be introduced into the water electrolysis stack 100 by the first control valve 450.

The second control valve 440 may be provided at a point at which the water may be branched from the water tank 430 into the first heat exchange unit 410 or the second heat exchange unit 420. A third channel through which the water is supplied may be controlled by the second control valve 440.

Figure 2:
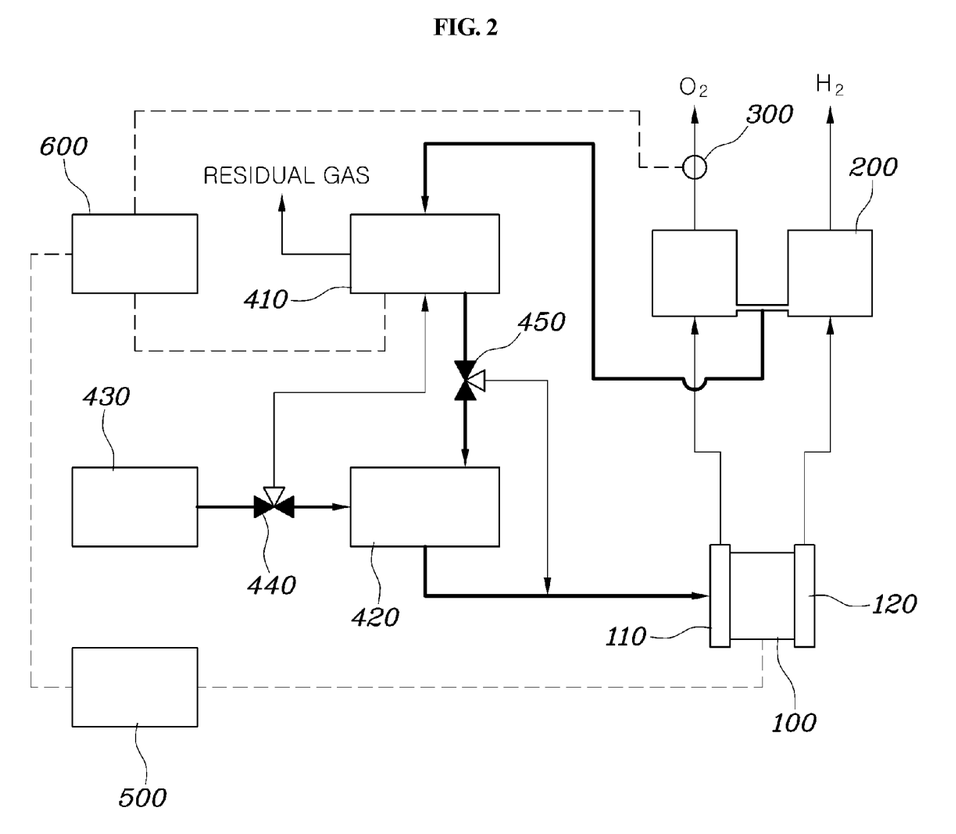
FIG. 2 is a view illustrating a re-supplying path of an electrolyte when the water electrolysis system according to an exemplary embodiment of the present invention is operated in a temperature raising mode.
Figure 3:
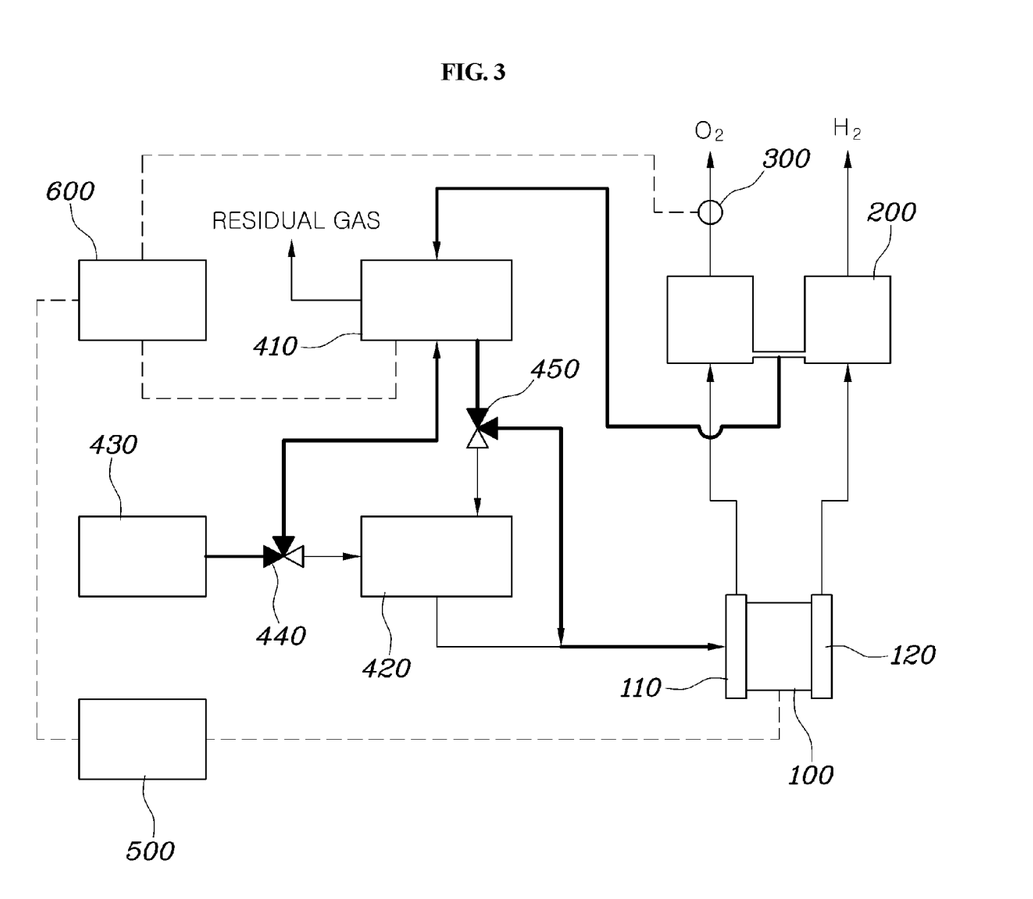
FIG. 3 is a view illustrating a re-supplying path of an electrolyte when the water electrolysis system according to an exemplary embodiment of the present invention is operated in an isothermal mode.

FIG. 2 is a view illustrating a re-supplying path of an electrolyte when the water electrolysis system according to an exemplary embodiment of the present invention is operated in a temperature raising mode, and FIG. 3 is a view illustrating a re-supplying path of an electrolyte in when the water electrolysis system according to an exemplary embodiment of the present invention is operated in an isothermal mode.

As shown in FIG. 2, in the temperature raising mode in which the concentration of hydrogen measured by the hydrogen sensor 300 is equal to or greater than the reference value, the electrolyte may pass through the first heat exchange unit 410 and the second heat exchange unit 420 and be then introduced into the water electrolysis stack 100. The electrolyte is heated in the first heat exchange unit 410. In this case, the electrolyte may be heated to a high temperature of 100° C. or greater so that the residual gas dissolved in the electrolyte may be discharged.

In the temperature raising mode, the first control valve 450 controls a second channel so that the first heat exchange unit 410 and the second heat exchange unit 420 are connected to each other, and the second control valve 440 controls a third channel so that the water tank 430 and the second heat exchange unit 420 are connected to each other. For example, the electrolyte from which the residual gas may be removed in the first heat exchange unit 410 may be introduced into the second heat exchange unit 420. The electrolyte may be heat-exchanged at a temperature of about 80° C., which is the normal operating temperature of the water electrolysis system, and be replenished with the water in the second heat exchange unit 420, and be then supplied to the water electrolysis stack 100.

In the temperature raising mode, the residual gas in the electrolyte is removed in the first heat exchange unit 410, and oxygen and hydrogen dissolved in the electrolyte may thus be removed. Since the electrolyte from which hydrogen is removed is supplied to the water electrolysis stack, the risk of explosion of the water electrolysis system may be reduced, and the water electrolysis system may be continuously operated. In a water electrolysis system according to the related art, when a concentration of hydrogen is measured to be an explosion lower limit or greater, an operation of the water electrolysis system is stopped, but in the present invention, stability of the water electrolysis system may be secured by removing hydrogen before the water electrolysis system is stopped, such that an amount of produced hydrogen may be maximized.

As shown in FIG. 3, in the isothermal mode in which the concentration of hydrogen measured by the hydrogen sensor 300 is equal to or less than the reference value, the electrolyte may pass through the first heat exchange unit 410 and be then introduced into the water electrolysis stack 100. That is, in the isothermal mode, the electrolyte bypasses the second heat exchange unit 420. The first heat exchange unit 410 maintains the electrolyte at a temperature of about 80° C., which is the normal operating temperature for the normal operation of the water electrolysis system.

In the isothermal mode, the first control valve 450 controls a second channel so that the first heat exchange unit 410 and the water electrolysis stack 100 are connected to each other, and the second control valve 440 controls a third channel so that the water tank 430 and the first heat exchange unit 410 are connected to each other. Therefore, the electrolyte may be replenished with the water in the first heat exchange unit 410, and the electrolyte passing through the first heat exchange unit 410 may bypass the second heat exchange unit 420 to be supplied to the water electrolysis stack 100.

Since the isothermal mode is an exemplary embodiment where the concentration of hydrogen measured by the hydrogen sensor 300 is a stable numerical value, the water electrolysis system is normally operated. Therefore, in the isothermal mode, the water electrolysis system is operated in a manner different from that of the temperature raising mode, which is an emergency mode, and in the present invention, the water electrolysis system may be efficiently operated by appropriately switching the temperature raising mode and the isothermal mode depending on the concentration of hydrogen measured by the hydrogen sensor 300 as described above.

Figure 4:
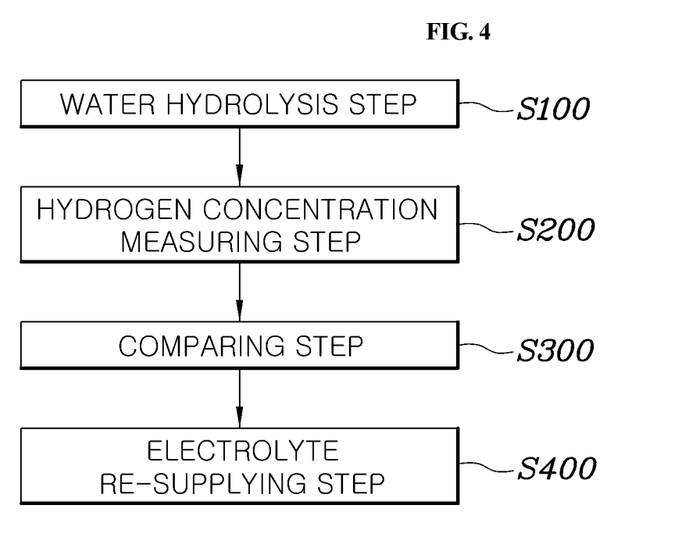
FIG. 4 is a flowchart illustrating a control method of a water electrolysis system according to an exemplary embodiment of the present invention.

FIG. 4 is a flowchart illustrating a control method of a water electrolysis system according to an exemplary embodiment of the present invention.

As shown in FIG. 4, the control method of a water electrolysis system according to an exemplary embodiment of the present invention may include a water hydrolysis step S100, a hydrogen concentration measuring step S200, a comparing step S300, and an electrolyte re-supplying step S400.

The water hydrolysis step S100 is a step of applying power to the water hydrolysis stack 100 and producing and separating hydrogen and oxygen by an electrolysis reaction. Reactions occurring in the anode 110 and the cathode 120 of the water hydrolysis stack 100 may be the same as those in the reaction formulas described above. Oxygen and hydrogen produced in the water hydrolysis stack 100 are introduced into the gas-liquid separation device 200 together with the electrolyte. The gas-liquid separation device 200 separates and discharges oxygen and hydrogen, and the electrolyte is discharged to the electrolyte re-supplying module 400.

The hydrogen concentration measuring step S200 is a step of measuring the concentration of hydrogen by the hydrogen sensor 300. The concentration of hydrogen contained in an oxygen gas discharged from the gas-liquid separation device 200 may be measured or the concentration of hydrogen dissolved in the electrolyte may be measured. Purity of oxygen may be grasped by measuring the concentration of hydrogen in oxygen, and an exemplary embodiment where the concentration of hydrogen in oxygen is about 4% may be determined as the explosion lower limit. When the water electrolysis system is operated, the hydrogen concentration measuring step S200 may be continuously performed to monitor the concentration of hydrogen.

The comparing step S300 is a step of comparing the concentration of hydrogen measured by the hydrogen sensor 300 with the reference value. The reference value may be variably set depending on a power generation load. For example, when the explosion lower limit is set to about 4%, 10% of the explosion lower limit may be set as the reference value. Preferably, the concentration of hydrogen in oxygen of about 0.4% may be set as the reference value. The comparing step S300 may be continuously performed during an operation of the water electrolysis system together with the hydrogen concentration measuring step S200.

The electrolyte re-supplying step S400 is a step of selectively heating the electrolyte on the basis of a comparison result between the concentration of hydrogen and the reference value in the comparing step S300 and then re-supplying the electrolyte to the water electrolysis stack 100. In the electrolyte re-supplying step S400, the electrolyte discharged from the gas-liquid separation device 200 may be introduced into the electrolyte re-supplying module 400, be replenished with the water, and be then supplied to the water electrolysis stack 100.

In the electrolyte re-supplying step S400, when the concentration of hydrogen is determined to be equal to or greater than the reference value in the comparing step, the water electrolysis system may be operated in the temperature raising mode of heating the electrolyte to remove the residual gas dissolved in the electrolyte, replenishing the electrolyte with the water, and then supplying the electrolyte to the water electrolysis stack 100. The heating temperature of the electrolyte may be a high temperature of 100° C. or greater. On the other hand, when the concentration of hydrogen is determined to be lower than the reference value in the comparing step S300, the water electrolysis system may be operated in the isothermal mode of maintaining the electrolyte at about 80° C., which is the normal operating temperature, replenishing the electrolyte with the water and then supplying the electrolyte to the water electrolysis stack 100.

The reference value set in the comparing step S300 may be variably set according to the operation of the water electrolysis system. For example, the concentration of hydrogen in oxygen of about 4% may be considered as the explosion lower limit to set the reference value to about 0.4%, which is 10% of the explosion lower limit. In this case, in the comparing step S300, the concentration of hydrogen in the oxygen measured in the hydrogen concentration measuring step S200 may be compared with 0.4%, which is the reference value. In the electrolyte re-supplying step S400, when the concentration of hydrogen in oxygen is about 0.4% or greater, which is the reference value, the electrolyte re-supplying module 400 may be operated in the temperature raising mode, and when the concentration of hydrogen in oxygen is less than about 0.4%, which is the reference value, the electrolyte re-supplying module 400 may be operated in the isothermal mode.

In addition, in the electrolyte re-supply step S400, when the concentration of hydrogen reaches about 25% of the explosion lower limit, a warning signal regarding the risk of explosion may be transmitted. A warning message may be transmitted to a display device or a sound signal may be transmitted through a speaker or the like to inform a user that an abnormality may occur in stability of the water electrolysis system. After the warning signal is transmitted, when the concentration of hydrogen reaches about 50% of the explosion lower limit, the water electrolysis system may be stopped.

According to the water electrolysis system and the control method thereof according to an exemplary embodiment of the present invention, the stability of the water electrolysis system may be secured by removing hydrogen and oxygen dissolved in the electrolyte and then supplying the electrolysis to the water electrolysis stack 100. The water electrolysis system may be efficiently operated by selectively heating the electrolyte supplied to the water electrolysis stack 100 on the basis of the concentration of hydrogen rather than simply heating the electrolyte.

According to various exemplary embodiments of the present invention, the electrolyte may be selectively heated to remove the residual gas and be then supplied to the water electrolysis stack to prevent hydrogen and oxygen from being mixed with each other. Therefore, the risk of explosion may be eliminated, such that the water electrolysis system may be stably operated.

In addition, the electrolyte may be selectively heated on the basis of the concentration of hydrogen, such that the water electrolysis system may be efficiently operated. Therefore, a power generation load of the water electrolysis system may rise, such that production efficiency of hydrogen may be increased.

Although the present invention has been shown and described with respect to exemplary embodiments, it will be apparent to those having ordinary skill in the art that the present invention may be variously modified and altered without departing from the spirit and scope of the present invention as defined by the following claims.

What is claimed is:

1. A water electrolysis system comprising:
   a water electrolysis stack comprising active electrodes receiving an electrolyte and producing hydrogen and oxygen by electrolyzing the electrolyte;
   a gas-liquid separation device receiving a product produced from the water electrolysis stack, separating the product into an electrolyte, oxygen, and hydrogen, and discharging the electrolyte, oxygen, and hydrogen;
   a hydrogen sensor measuring a concentration of hydrogen in oxygen discharged from the gas-liquid separation device or a concentration of hydrogen in a circulating electrolyte; and
   an electrolyte re-supplying module replenishing the electrolyte discharged from the gas-liquid separation device with water and then re-supplying the electrolyte to the water electrolysis stack, and selectively raising a temperature of the electrolyte on the basis of the concentration of hydrogen measured by the hydrogen sensor to remove gas in the electrolyte.

2. The water electrolysis system of claim 1, further comprising a controller controlling the electrolyte re-supplying module, controlling a first channel through which the electrolyte circulating through the electrolyte re-supplying module is supplied on the basis of the concentration of hydrogen measured by the hydrogen sensor, and controlling a heating temperature of the electrolyte.

3. The water electrolysis system of claim 2, wherein the controller controls the electrolyte re-supplying module to heat the electrolyte circulating through the electrolyte re-supplying module to a temperature equal to or greater than a normal operating temperature to remove a residual gas dissolved in the electrolyte, replenish the electrolyte with the water, and then supply the electrolyte to the water electrolysis stack, when the concentration of hydrogen measured by the hydrogen sensor is equal to or greater than a reference value, and the controller controls the electrolyte re-supplying module to maintain the electrolyte circulating through the electrolyte re-supplying module at the normal operating temperature, replenish the electrolyte with the water, and then supply the electrolyte to the water electrolysis stack, when the concentration of hydrogen measured by the hydrogen sensor is less than the reference value.

4. The water electrolysis system of claim 3, wherein the controller controls the electrolyte re-supplying module to maintain the electrolyte circulating through the electrolyte re-supplying module at the normal operating temperature of the water electrolysis system, and controls the electrolyte re-supplying module to heat the electrolyte to the temperature equal to or greater than the normal operating temperature in a case of heating the electrolyte.

5. The water electrolysis system of claim 4, wherein the normal operating temperature of the water electrolysis system is about 60° C. or greater and about 80° C. or less.

6. The water electrolysis system of claim 4, wherein the controller controls the electrolyte re-supplying module to heat the electrolyte to a temperature of about 100° C. or greater in a case of heating the electrolyte.

7. The water electrolysis system of claim 1, wherein the electrolyte re-supplying module controls a heating temperature of the electrolyte on the basis of a concentration of electrolyte.

8. The water electrolysis system of claim 1, wherein the electrolyte re-supplying module comprises a first heat exchange unit heating the electrolyte discharged from the gas-liquid separation device to raise the temperature of the electrolyte and replenishing the electrolyte with the water and a second heat exchange unit connected to the first heat exchange unit, replenishing the electrolyte supplied from the first heat exchange unit with the water, and then supplying the electrolyte to the water electrolysis stack.

9. The water electrolysis system of claim 8, wherein the electrolyte re-supplying module further comprises a branch point which is formed on a connection line between the first heat exchange unit and the second heat exchange unit and at which the electrolyte bypasses the second heat exchange unit to be introduced into the water electrolysis stack, such that the electrolyte passing through the first heat exchange unit is introduced into the second heat exchange unit or bypasses the second heat exchange unit to be directly introduced into the water electrolysis stack.

10. The water electrolysis system of claim 9, wherein the electrolyte re-supplying module further comprises a first control valve provided at a branch point at which the electrolyte is branched from the first heat exchange unit to the second heat exchange unit or the water electrolysis stack and controlling a second channel through which the electrolyte is supplied.

11. The water electrolysis system of claim 10, wherein the electrolyte re-supplying module further includes a water tank in which the water to be supplied to the electrolyte is stored and connected to the first heat exchange unit and the second heat exchange unit, and the water tank is connected to the first heat exchange unit and the second heat exchange unit so that the water discharged from the water tank is selectively branched into the first heat exchange unit or the second heat exchange unit.

12. The water electrolysis system of claim 11, wherein the electrolyte re-supplying module further includes a second control valve provided at a point at which the water is branched from the water tank into the first heat exchange unit or the second heat exchange unit and controlling a third channel through which the water is supplied.

13. The water electrolysis system of claim 12, wherein when the concentration of hydrogen measured by the hydrogen sensor is a reference value or greater, the first control valve controls the second channel so that the first heat exchange unit and the second heat exchange unit are connected to each other, such that the electrolyte is heated in the first heat exchange unit to remove a residual gas dissolved in the electrolyte and is then introduced into the second heat exchange unit, and the second control valve controls the third channel so that the water tank and the second heat exchange unit are connected to each other, such that the electrolyte passing through the first heat exchange unit is replenished with the water in the second heat exchange unit and is then supplied to the water electrolysis stack.

14. The water electrolysis system of claim 13, wherein the first heat exchange unit heats the electrolyte at a high temperature so that the residual gas dissolved in the electrolyte is discharged.

15. The water electrolysis system of claim 12, wherein when the concentration of hydrogen measured by the hydrogen sensor is less than the reference value, the second control valve controls the third channel so that the water tank and the first heat exchange unit are connected to each other, such that the water is introduced into the first heat exchange unit to be replenished in the electrolyte, and the first control valve controls the second channel so that the first heat exchange stack and the water electrolysis stack are connected to each other, such that the electrolyte passing through the first heat exchange unit bypasses the second heat exchange unit to be supplied to the water electrolysis stack.

\* \* \* \* \*